Inventor
William Van Berg

UNITED STATES PATENT OFFICE 2,337,138

DOCK BOARD

William Van Berg, Highland Park, Mich., assignor to General Motors Corporation, Detroit, Mich., a corporation of Delaware Application November 17, 1941, Serial No. 419,374

2 Claims. (Cl. 14—72)

This invention relates to an improvement in dock boards and more particularly to a simplified arrangement, effective without manual manipulation for locating the board against displacement during use.

An object of the invention is to provide an improved dock board for use in spanning the space between a loading dock and a railroad car or other transportation carrier spotted or docked beside the freight platform. Usually, the floor of the freight car is higher than the loading dock platform and is subject to variations in level as the load changes or as the car is rocked on its supporting springs. Accordingly the dock board generally extends at an angle between the two floor levels, which angle is variable depending upon particular conditions encountered in different types of freight cars and loading docks.

Regardless of the angle of inclination of the dock board, provision must be made for preventing creeping and displacement during use and it is among the objects of the present invention to provide an improved latching mechanism which comes into effect automatically when the dock board is placed in position and which maintains latching relation irrespective of variations in relative floor levels and which furthermore is arranged to accommodate variations in the spacings encountered at different docks with different freight cars.

Figure 1:
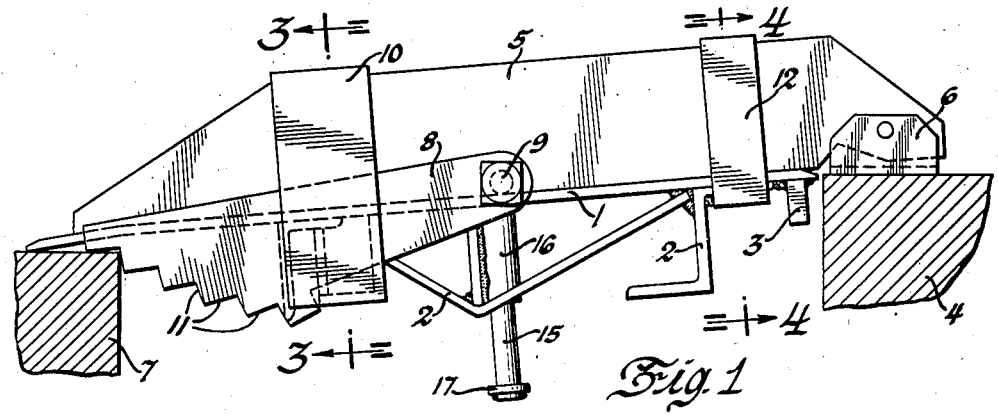
Figure 2:
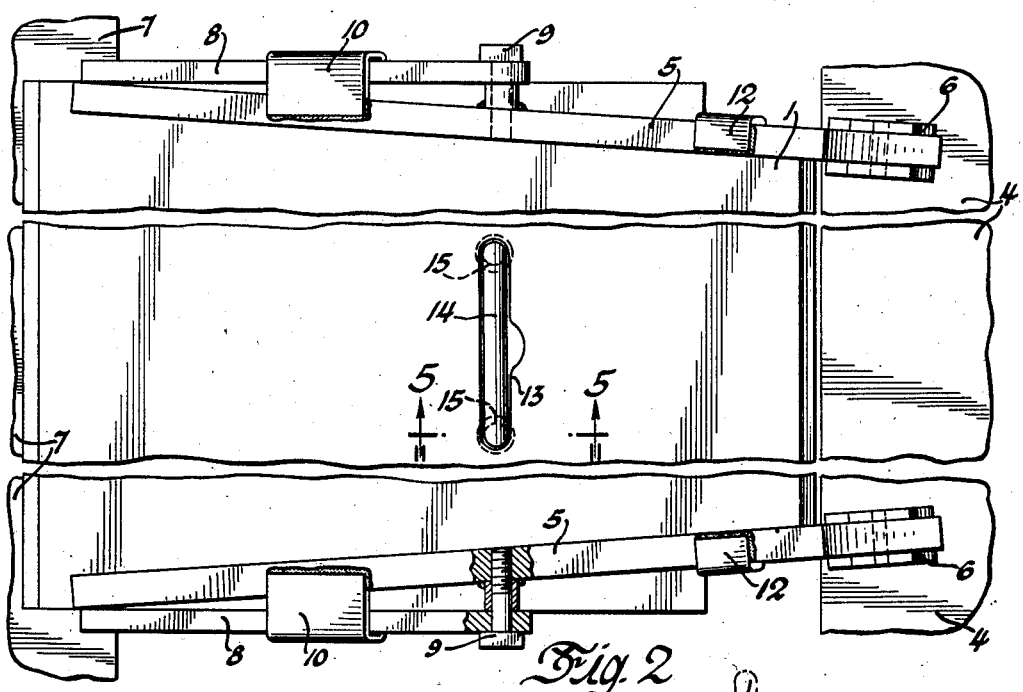
Figure 3:
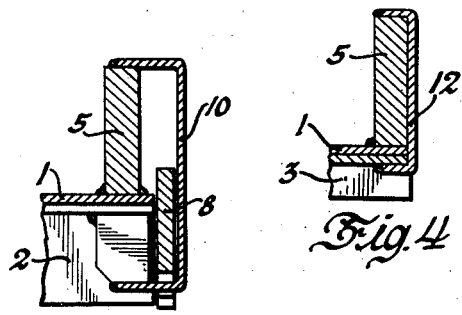
Figure 4:
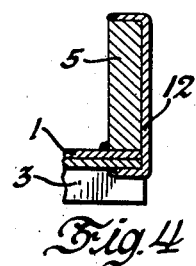
Figure 5:
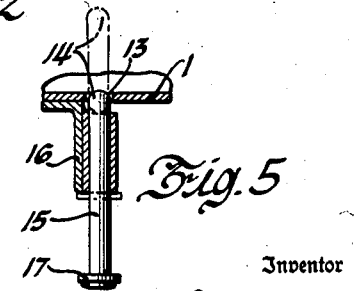

The invention will be best understood upon reference to the accompanying drawing of a preferred embodiment and wherein Figure 1 is a side elevation of a loading dock board in operative position; Figure 2 is a top plan view with parts broken away; Figures 3 and 4 are detail sections taken on lines 3—3 and 4—4, respectively, of Figure 1 and Figure 5 is a detail sectional view taken on line 5—5 of Figure 2.

Essentially the dock board consists of a hardened steel bridging plate 1 of a length sufficient to enable passage thereacross of an industrial loading truck and of a width to bridge the space between the floor structures. For stiffening purposes there may be welded on the underside of the plate a number of truss rails or reinforcements 2—2 together with an abutment rail 3 along one edge adjacent the upper level floor 4 which abutment rail helps to locate the plate with reference to the floor edge and resist displacement. The floor structure 4 may be considered the platform of a freight car and the adjoining edge of the bridge plate ends short of the edge of the floor structure and substantially flush therewith so as not to interfere with the movement of loading trucks into and out of the car. For supporting this upper edge of the bridge plate, the plate has welded near its ends upstanding rails 5—5 which project laterally beyond the edge in overhanging relation to the top face of the floor 4 and carry fulcrumed bearing shoes 6 which rest on the floor structure and provide a rocking bearing.

The opposite longitudinal edge of the bridging plate 1 overlaps the edge of the lower floor structure 7 and rests on the top surface thereof and since the plate is inclined upwardly therefrom this edge of the plate offers no interference to the passage of the industrial truck over the plate. Obviously during use the tendency of the plate to creep will be from the upper level floor toward the lower level floor and to resist this creepage there are provided at opposite ends of the dock board assembly, a pair of latching levers 8—8 for engagement with the edge of the floor structure 7. Each lever extends away from the floor structure edge at an angle of substantially 90° and is mounted on a fulcrum pin 9 threaded or otherwise anchored to the adjoining rail 5, so that the pin provides a pivotal axis extending substantially parallel to the edge of the bridging plate and allows the lever to swing in a vertical plane. The extent of vertical swinging of the lever is limited by a U-shaped keeper 10 embracing the lever 8 and having its end legs welded or otherwise secured to the dock board assembly. At its swinging end the lever is formed with the series of abutment seats 11 stepped back in relation to one another or spaced apart radially of the lever axis pin 9. These spaced abutment seats are selectively engageable with the edge of the adjacent floor structure and enable the dock board to be used in various situations in which the distance between the floors is different.

By reason of the pivotal mounting of the lever the lever will rock to accommodate whatever inclination is assumed by the dock board assembly and maintain latched engagement in all relative positions. When the removable dock board is placed in bridging relation to a pair of floor structures, its upper edge is positioned by the rock shoes 6 immediately adjacent the edge of the upper floor structure, while the lower board edge will overlap the lower floor structure a distance depending on the width of the space to be bridged, and the latching lever comes into play automatically to engage the lower floor edge by one of the seats 11, without requiring special attention on the part of the workman.

The U-shaped member 10 in addition to performing the function of the keeper for the latching member 8 also serves as a connector between the adjoining welded together parts of the dock board assembly. A similar U-shaped retaining clip near the opposite edge of the board is shown at 12.

Intermediate its length at one or more places the dock board is provided with a longitudinal slot 13 which receives the handle 14 of a U-shaped member having dependent legs 15 slidable in brackets 16 which are welded on the underside of the plate. At their lower ends the pins 15 carry bearing washers 17 and when the handle is lifted to the dotted line position as shown in Figure 5, the washers 17 engage against the underside of the bracket 16 and enable the dock board assembly to be supported by the handle 14. Ordinarily, the fork of an industrial lift truck will be used to engage the handle 14 for carrying the dock board to and from operative position.

I claim:

1. In a dock board, a floor plate to span the space between spaced floor structures, a latch bar pivoted on the plate and arranged with a series of radially spaced seats for self selective abutment with the edge of one of said floor structures and a latch bar keeper carried by the plate to limit relative movement of the latch bar and maintain it in position to bring said seats to said floor edge for their self selective abutment therewith.

2. For bridging space between floor structures out of horizontal alignment, a dock board having one edge portion adapted to overlap and rest upon the lowermost floor structure with the board extending upwardly in an inclined plane to the upper floor structure, a locating lever pivoted on the board and projected beside the board in the general inclined plane thereof toward the board edge which is to rest on the lower floor structure, a succession of radially spaced seats in the free end of the lever spaced inwardly of said edge and adapted when the lever drops below the plane of the board for self selective engagement with the lowermost floor edge overlapped by said board edge and a keeper carried by the board to guide swinging lever travel about its pivot and limit such travel to a range within which the lever always projects toward said board edge portion in position automatically to engage the floor edge as aforesaid.

WILLIAM VAN BERG.